(12) United States Patent
Mann et al.

(10) Patent No.: US 12,548,049 B2
(45) Date of Patent: *Feb. 10, 2026

(54) CELEBRITY-BASED AR ADVERTISING AND SOCIAL NETWORK

(71) Applicant: Virtual Rights Management LLC, Bel Air, CA (US)

(72) Inventors: Darren Mann, Sherman Oaks, CA (US); Rebecca Jonah, Beverly Hills, CA (US)

(73) Assignee: Virtual Rights Management LLC, Bel Air, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,289

(22) Filed: Sep. 23, 2024

(65) Prior Publication Data

US 2025/0014078 A1 Jan. 9, 2025

Related U.S. Application Data

(63) Continuation of application No. 17/857,705, filed on Jul. 5, 2022, now Pat. No. 12,125,071, which is a continuation of application No. 17/203,477, filed on Mar. 16, 2021, now Pat. No. 11,379,884.

(60) Provisional application No. 62/990,304, filed on Mar. 16, 2020.

(51) Int. Cl.
| | |
|---|---|
| *G06Q 30/00* | (2023.01) |
| *G06F 18/22* | (2023.01) |
| *G06Q 30/0241* | (2023.01) |
| *G06Q 30/0251* | (2023.01) |
| *G06Q 30/0273* | (2023.01) |
| *G06V 10/75* | (2022.01) |
| *G05B 19/418* | (2006.01) |

(52) U.S. Cl.
CPC ......... *G06Q 30/0275* (2013.01); *G06F 18/22* (2023.01); *G06Q 30/0264* (2013.01); *G06Q 30/0276* (2013.01); *G06V 10/75* (2022.01)

(58) Field of Classification Search
CPC ........... G06Q 30/0275; G06Q 30/0264; G06Q 30/0276; G06F 18/22; G06V 10/75; G06V 2201/09
See application file for complete search history.

(56) References Cited

U.S. PATENT DOCUMENTS 10,580,043 B2 * 3/2020 Publicover .............. H04W 4/21
2019/0303807 A1 * 10/2019 Gueye ................ G06F 16/9537

OTHER PUBLICATIONS

"TRAP: Using Targeted ads to unveil Google personal profiles". IEEE. 2015. (Year: 2015).*

* cited by examiner

*Primary Examiner* — Maria V Vanderhorst

(57) ABSTRACT

A method for celebrity-based advertising includes storing, in a server, a likeness of subject and a corresponding booking that includes parameters outlining availability of the subject for digital advertising. The method further includes receiving or creating, by the server, a pitch that falls within the parameters of the booking, the pitch corresponding to the subject. The method further includes receiving, by the server and from a first user device, a first image of the likeness of the subject or another likeness of the subject. The method further includes determining, by the server, that the image matches the likeness of the subject. The method further includes transmitting, by the server, the pitch to the first user device to be output by the first user device.

20 Claims, 15 Drawing Sheets

US 12,548,049 B2

CELEBRITY-BASED AR ADVERTISING AND SOCIAL NETWORK

CROSS-REFERENCE TO RELATED APPLICATIONS

This application is a continuation of, and claims the benefit and priority of, U.S. application Ser. No. 17/857,705, titled Celebrity-Based AR Advertising and Social Network and filed on Jul. 5, 2022; which is a continuation of, and claims the benefit and priority of U.S. application Ser. No. 17/203,477, titled Celebrity-Based AR Advertising and Social Network and filed on Mar. 16, 2021; which claims the benefit and priority of U.S. Provisional Application No. 62/990,304, titled Celebrity-Based AR Advertising and Social Network and filed on Mar. 16, 2020, the entire contents of all being hereby incorporated by reference in their entirety.

BACKGROUND

1. Field

This specification relates to systems and methods for fan engagement via celebrity-based advertising as well as both celebrity and brand NFT promotion and sales using augmented reality that incorporates applications distributed across a system of users, advertisers, and stars.

2. Description of the Related Art

Augmented reality has been advancing in popularity as the technology has advanced. This technology allows content to be overlaid over an existing image on a display, such as an image captured by an image sensor of a device. For example, a user may point a camera of a smartphone towards an object; the display of the smartphone may output a representation of the object and augmented reality software may cause information to overlay the representation of the object, augmenting the user's perception of his environment.

As with most technology, advertisers wish to capitalize on the "newness" or "cool-factor" of augmented reality. However, it has been difficult for such advertisers to take advantage of the augmented reality space. Of particular difficulty has been how to incorporate desirable subjects (such as stars, or celebrities) within augmented reality advertisements. Difficulty has arisen in various ways. For example, technology has not been sufficiently advanced to be able to identify a celebrity based on an older picture of the celebrity. Even if this challenge is overcome, it has been difficult for an advertising company to obtain permission to use the celebrity in an augmented reality advertisement, or to find alternative celebrities who can attract a target demographic audience.

Thus, there is a need in the art for systems and methods for celebrity-based augmented reality advertising.

SUMMARY

Described herein is a method for celebrity-based advertising. The method includes storing, in a server, a likeness of subject and a corresponding booking that includes parameters outlining availability of the subject for digital advertising. The method further includes receiving or creating, by the server, a pitch that falls within the parameters of the booking, the pitch corresponding to the subject. The method further includes receiving, by the server and from a first user device, a first image of the likeness of the subject or another likeness of the subject. The method further includes determining, by the server, that the image matches the likeness of the subject. The method further includes transmitting, by the server, the pitch to the first user device to be output by the first user device.

Also described is another method for celebrity-based advertising. The method includes storing, in a server, a likeness of subject and a corresponding booking that includes parameters outlining availability of the subject. The method further includes notifying, by the server, agency devices that the booking is available for bidding and a description of the parameters. The method further includes receiving, by the server and from the agency devices, multiple bids for the booking. The method further includes determining, by the server, a winning bid from the multiple bids. The method further includes notifying, by the server, at least one winning agency device that the at least one winning agency device corresponds to the winning bid. The method further includes receiving or creating, by the server, a pitch that falls within the parameters of the booking and corresponds to the winning bid, the pitch including an augmented reality visual. The method further includes receiving, by the server and from a first user device, a first image of the likeness of the subject or another likeness of the subject. The method further includes transmitting, by the server, the pitch to the first user device for outputting by the first user device such that the augmented reality visual is output on the first user device.

Also described is another method for celebrity-based advertising. The method includes storing, in a server, a likeness of subject and a corresponding booking that includes parameters outlining availability of the subject. The method further includes receiving or creating, by the server, a pitch that falls within the parameters of the booking. The method further includes receiving, by the server and from a first user device, a first image of the likeness of the subject or another likeness of the subject. The method further includes determining, by the server, that the image matches the likeness of the subject using machine learning such that the server determines that the first image matches the likeness of the subject regardless of an age of the subject in the first image or an age of the subject in the likeness, and regardless of an angle of the object within the first image or an angle of the object within the likeness. The method further includes transmitting, by the server, the pitch to the first user device for outputting by the first user device, the pitch including an augmented reality visual that is output on a display of the first user device.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

The present disclosure is directed to systems and methods for providing a platform that exploits the virtual space around visual instances of subjects (e.g., celebrities within the entertainment and sports industries, political personalities, iconic objects such as logos, or the like ("star" or "stars")) to deliver relevant advertising, marketing, promotional, and transactional virtual experiences relevant to those stars via augmented reality (AR).

More specifically, these stars are defined by a unique database of visual reference information ("VRI" or "VRIs," e.g., images) that is used to evoke AR experiences ("pitch" or "pitches") that promote, market, advertise, and/or sell retail items or events, and/or that deliver relevant information to targeted demographics ("audiences" or "users"). The pitches may be set to only occur at discrete dates, times, and geo-locations ("booking" or "bookings") that are related to those specific visual instances of the Stars.

The systems and methods described herein provide a novel way of exploiting the virtual space around these subjects that allows those who hold the rights to the subjects to financially gain while advertising and marketing agencies to achieve a new, unique, and "cool" way to reach new target audiences with their marketing. The systems and methods further provide significant flexibility for these advertising and marketing agencies to market any type of subjects such as humans, residences, cartoons, logos, teams, venues, or any other subject. The advanced technology that implements these methods allows a user device to access a pitch by capturing any image of a subject regardless of the age of the subject in the captured image and regardless of the angle at which the image was captured.

The systems and methods also provide a way for users to interact with other users who share a love of the same subject of the pitches. This subject-based social network is appealing to users because they can join a community of like-minded people to discuss one of their favorite subjects. This social-network aspect will rapidly grow the user base, thus making the systems and methods more appealing to stars (increasing availability of subjects for agencies to monetize, and increasing demand for users) and to agencies (which in turn increases the draw for more subjects to join).

Figure 1:
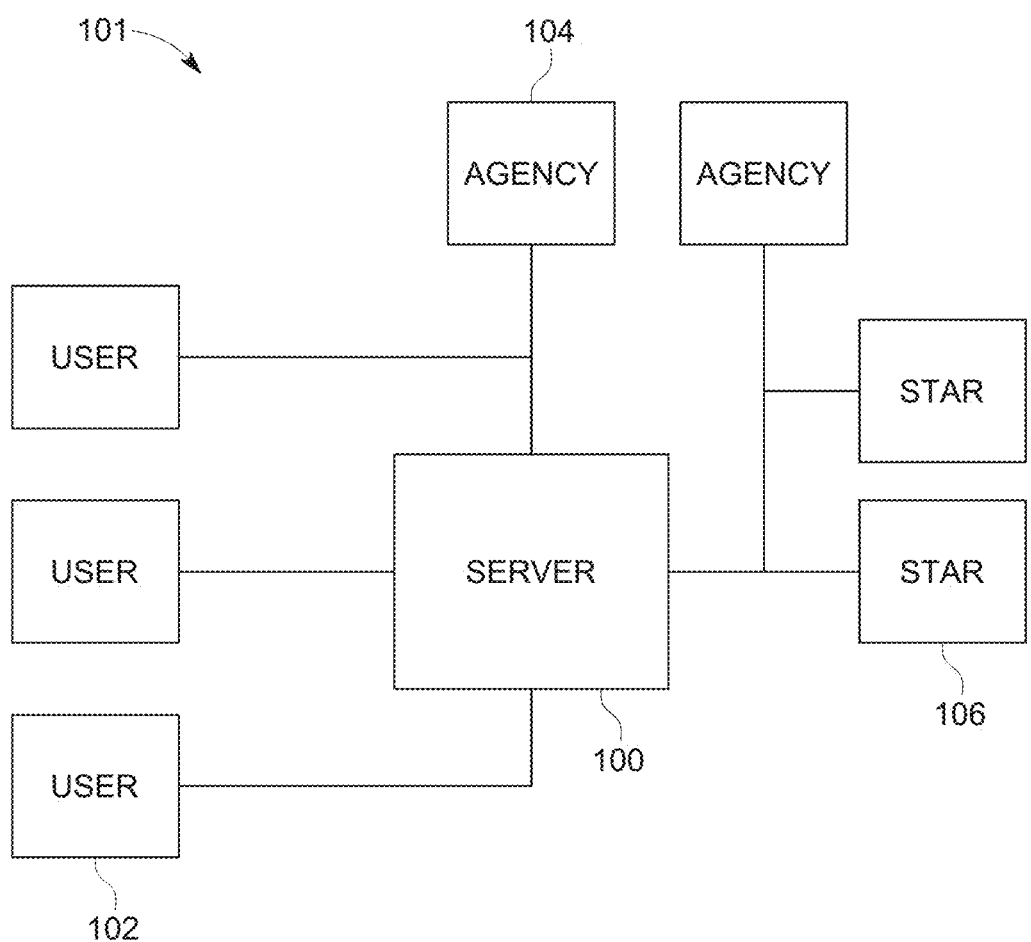
FIG. 1 is a block diagram illustrating an exemplary system for celebrity-based augmented reality advertising, according to various embodiments of the invention.

Referring to FIG. 1, a system 101 for providing such a platform is shown. The system includes a server 100 along with multiple user devices 102, multiple agency devices 104, and multiple star devices 106. The server 100 may manage most of the functions of the system 101, as will be later described. Where used herein, "server" may refer to a conventional computing server or to any other computing device such as edge computing devices, mobile devices (such as mobile telephones), tablets, or any other device capable of performing logic functions.

Each of the star devices 106 may include a computing device such as a mobile phone, a laptop, a tablet, a desktop, or the like. A star (e.g., celebrity) may establish a contractual account with the operator of the system 101 that allows the star device 106 to download the star booking application (star app). Within the star app on the star device 106, the star can create a profile indicating the general type, category and/or specific description of the pitch or pitches that the star will permit to be tied to its image and unique database of VRIs. The star may supply the server 100 via the star device 106 with all necessary visual reference material that will serve as VRIs for the specific AR pitch. The star may also contract with the owner of the system 101 separately to create the necessary VRIs that will correspond to a specific AR pitch.

The profile of the star may include rules allowing for certain types of pitches to be created without the star's consent. For example, a star may say that any agency that wants to use his likeness for advertising can do so as long as he receives at least a certain dollar amount per unit of time and/or per geographical space. For example, the star may say that his likeness can be used (within the rules of the profile) if he receives at least $50,000 per 50 square miles per day. Where used herein, "likeness" refers to a representation of the star and may be identifiable using machine vision. The likeness may include image data, a digital list of features (in any format), biometric data, or any other digital or other data usable to identify or represent the star. For example, a memory may store a likeness of Person A which may include one or more image of Person A, a list of features usable to identify Person A, biometric data associated with Person A, or the like.

The profile of the star may include rules that apply limits to, or prevent, certain bookings. For example, a star may say that he does not want his likeness associated with vaping advertisements, another star may say she does not want her likeness associated with companies that test their products on animals, and a third star may say that her likeness cannot be used to market carbonated beverages because of an exclusive deal she has with Pepsi.

Still using the star device 106, the star may input a booking within the star app that defines a visual event. For example, the booking may include the publication of a 2D print magazine, newspaper, or poster that relates to a unique category of VRI. The star may also include a narrative that describes or explains the significance of the particular booking. For example, the booking may include Jennifer Aniston appearing on the cover of People Magazine where the audience can activate the AR pitch by pointing a camera of a user device 102 at a copy of the magazine at a news stand. The booking may also be a pre-recorded or live broadcast TV appearance, or a live appearance (e.g., sporting event or concert). In some embodiments, the booking may simply include any likeness of the star, and may or may not be limited by geography, media type, or the like. For example, the booking may include any image of Russel Wilson. In various embodiments, a pitch may be evoked on the user device 102 in response to the star's likeness appearing during a user browsing the internet (e.g., going to a website where an image of the star is located) and/or while a user is browsing social media (e.g., a meme with a star's image appears in the social media feed).

Some bookings may be geo-fenced. For example, the booking may include Jennifer Aniston appearing at the Emmys. If the booking is non-geo-fenced, the audience may activate the pitch by pointing the camera of the user device 102 at a TV screen when Jennifer Aniston is shown. However, the booking may be geo-fenced to only those in attendance. In that regard, the GPS of user devices 102 will provide the GPS or other location data to the server 100, and the server 100 will only show the pitch to audience members in attendance at the Emmys who capture Jennifer Aniston using the camera of their user device 102.

The star device 106 may provide a graphical or text-based calendar that the star can use to select when bookings are available, as well as a mapping interface to specify the geolocations at which the bookings are available. For example, the star may elect for the booking to only occur in California from June 2 through June 10, and to only apply to images of the star on posters promoting his new movie. As another example, the star may set a booking to be country-wide for any image of the star. In some embodiments, the booking may be a television program. In such embodiments, the star, using the star device 106, may specify the network or cable channel along with the time and date of the airing(s) of the television program.

The server 100 may manage all bookings and stars. For example, the server may have a list of all stars and their profiles, including when they allow bookings. The server may further receive the bookings from the star devices 102 as they are generated. In some embodiments, the server 100 may generate the bookings based on information provided by the star devices 102. For example, the star devices 102 may say that the star has a movie coming out and they want to monetize the star's likeliness as related to the movie anywhere in the United States. The server 100 would then create a booking that allows marketing or advertising agencies (agencies) to purchase, or bid on, pitches. The pitches may then be limited only to images of the star and other information related to the movie in the same photo (such as a movie poster with the star and name of the movie). The bookings may be exclusive such that only a single pitch may be associated with the booking at any specific location or time, or may be non-exclusive such that multiple pitches may be associated with the booking at a specific location or time.

The agency devices 104 may include a computing device such as a mobile phone, a laptop, a tablet, a desktop, or the like. Marketing agencies may have marketing accounts or profiles and may access such accounts or profiles (hereinafter, accounts) via the agency devices 104. In some embodiments, the server 100 may have an available list of bookings, and the agencies can bid on the bookings using the agency devices 104 at any time. For example, the agencies may log into the server 100, review the available bookings, and bid on one or more of them. In some embodiments, the agency profiles may include specific desirable parameters, stars, geolocations, dates, times, demographics, or the like that they prefer, and the server 100 can send a message to the associated agency device 104 when a booking becomes available that matches one or more of the desirable parameters. In some embodiments, the server 100 may transmit a message to all agency devices 104 (or to other devices associated with the agencies such as via text or email) when any new booking becomes available.

The agency devices 104 may display a list of all currently active and upcoming stars and bookings available for bidding now or in the future. The bidding may be in the form of a timed auction where the agency selects a star and/or a booking of interest. The bidding may be divided by date, time, geolocation, demographics, or the like. The bidding may be performed via a calendar and map graphical user interface. Live bidding may be displayed along with the availability of bidding parameters.

For example, an agency may bid a first dollar amount on a booking for the western United States for the whole day of April 15 for Spanish speaking users. Another agency may bid a second dollar amount on a booking for the eastern United States on the same day for English speaking users. In response to a conflict occurring (e.g., overlapping geolocations-a first agency bids on the western United States and a second agency bids on California), the server 100 may determine how to best carve out the bids that will result in the most money being raised for the booking. Continuing the above example, even though the bid for the entire western United States is greater than the bid for California, there may be bids for multiple single western states such that a combined dollar amount of those bids is greater than the bid for the entire western United States.

The winning agency or agencies may submit the parameters of the pitch via the agency device 104. The parameters may be in the form of an AR event on a user device 102. The parameters may include, for example, a graphic, text, animation, video clip, or the like. The parameters may also or instead include a purchasing/transactional event such as a retail product purchase, a concert ticket purchase, or the like. The parameters may also or instead include promotional materials such as a free download of an artist's song or a discount code to use towards purchasing a ticket for a show. In various embodiments, the pitch may be in the form of a graphic or video on the display screen in addition to, or instead of, an AR overlay experience. In various embodiments, the pitch may be in the form of a two-dimensional video, graphic, or AR overlay; a three-dimensional video, graphic, or AR overlay; or the like.

The server 100 may generate the AR event based on the parameters provided by the winning agency. In some embodiments, the server 100 may have templates prepared for each type of pitch (e.g., celebrity, movie promotion, music venue, etc.). In some embodiments, the agency may generate their own AR event and transmit it to the server 100 via the agency device 104. In some embodiments, the agency may request a customized pitch from the company that operates the system 101 for an extra fee.

The agencies may access a dashboard on the agency devices 104. The dashboard may display such information as which upcoming pitches they have, whether a favorite star is going to be available soon, or the like. The agency may further use the dashboard to set parameters of the pitches. For example, they may set the pitches to be at certain dates, times, geolocations, demographics, etc. In some embodiments, this may be done before bidding or after winning a bid.

The system 101 may attract users via public relations announcements, social media, celebrity promotions, and word of mouth. In that regard, the general public may download the user app onto a user device 102. The user device 102 may include only mobile devices such as smartphones, tablets, AR and/or MR optical devices, or the like. In some embodiments, the user app will only be available to current (2 to 3-year-old) IOS and Android smartphones, and only the most popular brands of Android smartphones.

After downloading the user app, the user may sign into the user app by email, Facebook, Twitter, Instagram, Google, or the like. The user app may retrieve key demographic information, likes, and friends (associates) from Facebook, Twitter, Instagram, and Google. In some embodiments, the user app may request verification that the user is at least of a certain age. The user app may further give the user the option of creating a social profile and interest list (user profile). The user profile may include gender identification, geographical location, payment method (PayPal, Venmo, credit card, etc.), general interests (e.g., sports fan or heavy metal fan), favorite movies, favorite bands/artists, favorite actors, or the like.

In some embodiments, the users may interact with each other via the user devices 102. For example, the app may have a live chat or text function where the users can comment on and interact with other users and the stars. For example, a group of users of the app may have each found a pitch. Upon finding the pitch, the users may interact with each other to discuss the content of the pitch, the subject of the pitch (e.g., the star), or the like. If the pitch includes the star, the star may be available for group chat as well. For example, the pitch may indicate that the star will be on the group chat function at a specific date and time to encourage the users to re-join the group chat at the specified date and time.

Some users may always run the user app on the user device 102 in the background. Other users may only turn the app on from time to time. If there is a pitch in the geographical area of a user device 102 that matches the user profile, the user app may notify the user of such pitch via a banner, vibration, sound, or the like. This matching may be done by the user device 102 or the server 100. The user device 102 may give hints as to the pitch such as a name of a star, a name of a movie, a name of a football team, or the like. The user device 102 (or server 100) may further determine that the user device 102 is 10 feet away from the pitch and may tell the user this information.

When a user activates the app on the user device 102, the camera will automatically be turned on. This allows the user app to point the camera at the booking and activate the pitch. If the pitch includes the option for a purchase or download or other transaction, the user device 102 may display a button to activate the transaction. If the user profile includes a payment method, the user device 102 may automatically complete the transaction with the server 100 after confirmation by the user. Any media along with a receipt will be transmitted to the user device 102 in the form of an email, text, via the app, or the like.

The server 100 may manage all auction parameters and generate booking confirmations as well as subsequent billing statements to the agencies. The server 100 may also manage all user transactions, generate receipts, and generate subscription statements. The server may also generate user engagement statistics, trends, and reporting documents. These statistics may include, for example, what percentage of females between 30-40 years old completed a transaction for a specific pitch, what percentage of Spanish speakers found a specific pitch with their user device 102, or the like.

As mentioned above, a star may generate a booking with her likeness without any limitations (time, geographical, or the like). In that regard, the server 100 is designed to identify a specific person (e.g., the star) regardless of the age of the photograph or the VRI information associated with the booking. For example, the server 100 may receive a picture of Jennifer Aniston from yesterday and one from 20 years ago, and based on its logic, identify both as Jennifer Aniston. The server 100 is also designed to identify a non-human subject (such as a sports logo, a sports team, a music venue, or the like) regardless of the age of the non-human subject captured in the photograph or in the associated VRI information. This ageless identification feature is provided by a combination of biometrics, machine vision (e.g., object recognition and neural networking), and signal processing (e.g., fast fourier transform (FFT)). Biometrics allows for such identification with a relatively small data set, which may be sufficiently small to save on a mobile device (e.g., user device 102) in order to reduce latency of the system 101.

Once an image is received by the server 100, the search begins with a variation of biometrics, machine learning, and signal processing. As more pictures are received by the server 100, the server 100 trains itself based on the new pictures. The server 100 may initially compare the received images to a gallery of images. Hidden levels of the machine learning compare parameters of each image and each input and output pair. For example, the server 100 may identify the object with 70% certainty the first time an image with the object is received. The server 100 may then learn where the mistake occurred in the hidden levels, fix the hidden level parameters, and then guess with greater accuracy the next time an image with the object is received.

It may be important for the server 100 to analyze the entire image that is received rather than the main subject of the image only. As an example, The Rock may be on posters promoting a movie, and may also be on the cover of people magazine. The Rock may create bookings for both the movie and people magazine. In that regard, it is important for the server 100 to differentiate the two based on machine vision, e.g., by identifying the logo of people magazine or the title of the movie along with his image. This is important because agencies may only be buying ads for people magazine, or for the poster. As another example, the system 101 may launch a different AR experience based on the source of the image. As yet another example, a first agency may buy an ad for people magazine, and another agency may buy an ad for the poster. The server 100 may determine whether the image corresponds to people magazine or the poster and activate the correct pitch based on the determination.

The server 100 may also be able to identify the subject based on any one or more of an image of a two-dimensional object (such as a magazine cover), an image of a three-dimensional object (such as a statue of the subject), video that include the subject (e.g., by capturing an image of a movie that is playing that includes the subject), or a real-life interaction with the subject (e.g., by capturing an image of the subject at a live event). The server 100 is capable of identifying the subject based on any of these types of detected image data.

The pitches may include any advertisement or information related to the subject. For example, a photograph of Jennifer Aniston on a magazine cover may include a specific outfit. A pitch may include information related to each item of clothing in the outfit (e.g., blouse, pants, jacket, and purse) which may be overlaid on the representation of the photograph on the user device. The information may include a manufacturer, a style number, a price, and a link to purchase each item of clothing from the manufacturer or a reseller.

As another example, the subject may be Russel Wilson as featured on an episode of Celebrity Homes. As the user directs the camera of the user device at the telephone, the pitch may include information related to each object in the home such as a name of the object, a manufacturer, a style number, a price, and a link to purchase each object in the home.

Similar information as the above-two examples may be provided by a pitch without the AR overlay of information. For example, a user may use the user device to capture an image of Russel Wilson. The user device may then access a pitch from the server 100 associated with Russel Wilson that includes a virtual reality tour, or a series of photographs, showing portions of his home. The tour or photographs may include representations of each object in his home along with the information such as item name, manufacturer, style number, price, link to purchase, or the like.

As yet another example, a subject of a pitch may be a stage home in a new development. As the user tours the home, the user may direct the phone camera towards various objects in the home (e.g., a bed, a chest of drawers, or the like). As the app identifies these objects, the app may output information related to each object such as an item name, a manufacturer, a style number, a price, a link to purchase, or the like.

Although the specification has focused on human subjects, the system 101 may equally apply to other, non-human subjects, such as sports teams, logos, Apple products, music venues, or the like. The system 101 may generate pitches for any of these subjects, users may interact with such subjects in a similar manner as with star subjects, and agencies may access and bid on bookings for such non-human subjects.

The system 101 provides various benefits and advantages to users. For example, it may offer exclusive content and deals for users associated with highly visible people. The system 101 further allows users to see what their influencers are doing, may provide special offers (e.g., discounted ticket price to a concert), or the like. The system 101 provides benefits to stars as well. They can get paid for the virtual rights to their likeness by advertisers, creating additional revenue streams that previously did not exist. The agencies also reap benefits because the system 101 is a new way to utilize a "cool" technology (AR) to target ads to users.

The system 101 can also be gamified in many ways. For example, a pitch may include a challenge that whoever collects the greatest quantity of unique images of Jennifer Lopez will get a backstage pass to her next concert. Collection of these unique images may be traceable via a decentralized blockchain or via a central database (e.g., on the server 100).

In some embodiments, a pitch may include non-fungible token (NFT) virtual objects. These NFT virtual objects may be collected by users using the user device 102 and may be redeemable (e.g., a certain one or more virtual object may be redeemable for discount codes, giveaways, other prizes, or the like). These NFT virtual objects may be blockchain traceable. The NFTs may be generated in addition to, or instead of, an AR event or other parameter of a pitch. In that regard, the pitch may include a trigger to cause the server (or another device) to mine a NFT. The pitch that is transmitted to the user device 102 may include the NFT, or the NFT may be added to an account associated with the user or user device. For example, a user device may capture an image of a star that is associated with a booking. The image may be transferred to the server 100 which may identify the star and provide the pitch to the user device 102. The server 100 may further mine a NFT, transmit a notification of the NFT to the user device 102, and add the NFT to an account associated with the user. The server 100 may also transmit an AR event to the mobile device 102 to be output via the mobile device.

In some embodiments, each of multiple NFTs may be associated with a single image of a star. For example, a first NFT may be associated with an image of Russel Wilson during a live football game, and a second NFT may be associated with an image of Russel Wilson on the cover of Sports Illustrated. In that regard, the NFTs may be considered collectables such that a fan of a star (e.g., Russel Wilson) may attempt to collect as many NFTs associated with the star (Russel Wilson) as possible. This both involves the celebrity (thus increasing a quantity of users of the system 101), and also provides an incentive for brands to work with the operator of the system 101 (thus increasing a quantity of brands working with the operator).

As referenced above, the NFTs may be considered collectables. In that regard, a specific pitch or new NFT may be provided to the user device 102 by the server 100 when a user collects a specific set of NFTs. For example, the server 100 may generate or provide an AR video of Russel Wilson spiking a football when the user collects the two NFTs referenced above.

Figure 2:
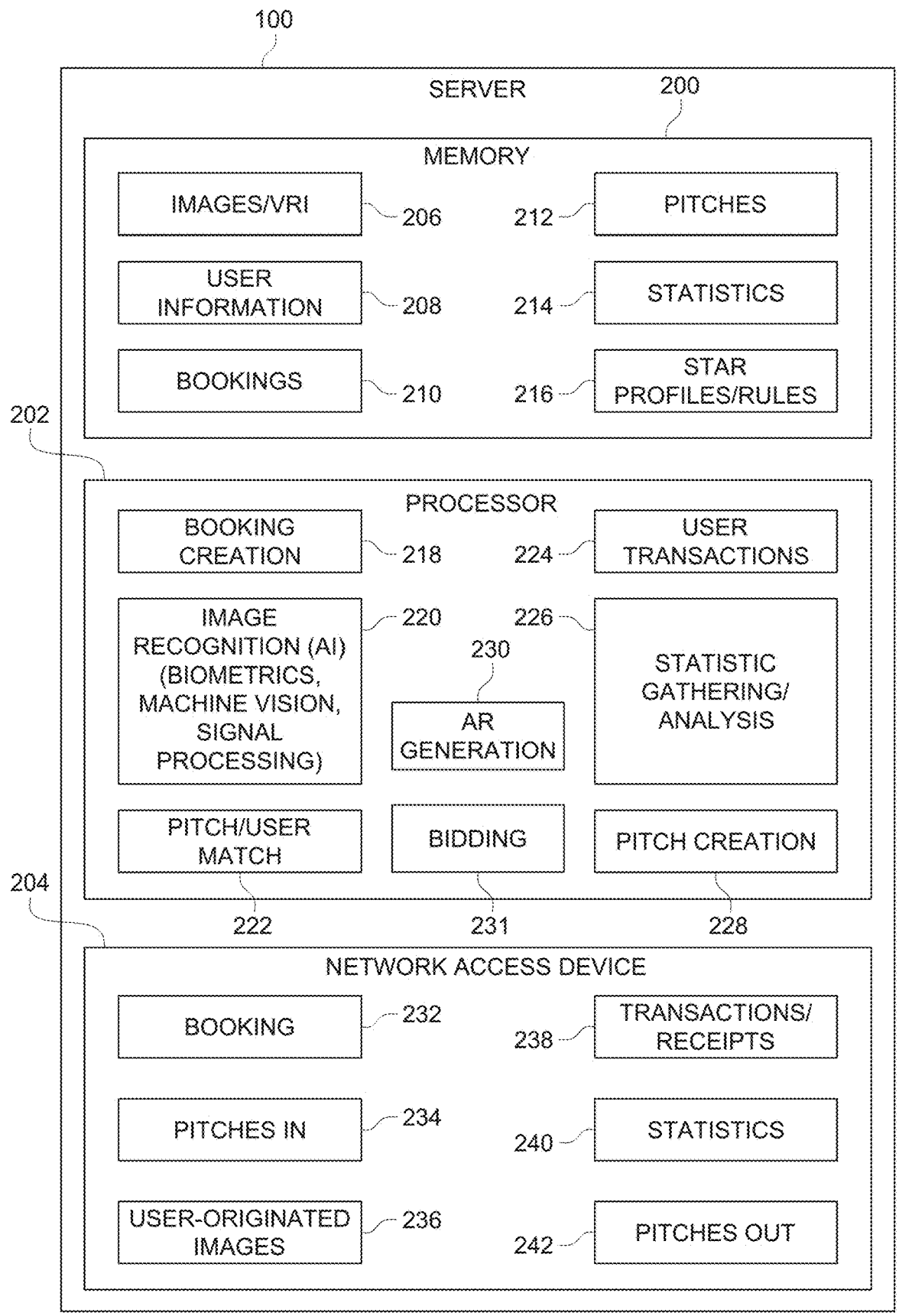
FIG. 2 is a block diagram illustrating various features of an exemplary server used in the system of FIG. 1, according to various embodiments of the invention.

Referring now to FIG. 2, additional details of the server 100 are shown. In particular, the server 100 includes a memory 200, a processor 202, and a network access device 204. The memory 200 may include any non-transitory memory. The processor 202 may include any processor, controller, discrete logic device, or the like capable of implementing logic. The network access device 204 may include any wired or wireless network access device capable of communicating via any protocol such as ethernet, Bluetooth, Wi-Fi, 4G, 5G, or the like.

The memory 200 may be designed to store various pieces of information, some of which are shown in FIG. 2. For example, the memory 200 may be designed to store images or visual reference information (VRI) 206. For example, the images 206 may correspond to images of stars, logos, brands, or the like.

The memory 200 may further be designed to store user information 208. The user information 208 may include information such as demographics of each user, each user's login information, likes and dislikes of each user, or the like.

The memory 200 may further be designed to store bookings 210. The bookings 210 may include any bookings such as those generated by a star, requested by an advertising agency, or the like.

The memory 200 may further be designed to store pitches 212. The pitches 212 may include pitches generated by stars, pitches generated by agencies, templates of pitches that the server 100 or agencies may adjust to their liking, or the like.

The memory 200 may also store statistics 214. These statistics 214 may relate to any user transactions, success of any pitches, or any other statistics or big data information.

The memory 200 may also store star profiles and rules 216. The star profiles and rules may include information related to the stars such as whether they are open to bookings any time or only at certain times, what types of bookings or pitches they prefer to avoid (e.g., whether they are opposed to being involved with pitches related to vaping), or the like.

The memory 200 may further be designed to store instructions usable by the processor 202 to perform any of the functions of the processor 202.

The processor 202 may be designed to perform various functions, some of which are shown in FIG. 2. For example, the processor 202 may be designed to perform a booking creation function 218. The booking creation function 218 may be used to create a booking. For example, a star may transmit a request for a booking to be created, and the function 218 may create the booking.

The processor 202 may further perform an image recognition function 220. The image recognition function 220 is designed to recognize images and may be based on an artificial intelligence algorithm. In particular, the function 220 may be performed using a combination of biometrics, machine vision, and signal processing in order to accurately identify any image received by the server 100. The function 220 may be designed, for example, to identify a specific person regardless of the time at which an image of the specific person was taken. As an example, the function 220 may be able to identify an image of The Rock regardless of whether the image was taken 20 years ago or 2 days ago.

The processor 202 may further be designed for a user and pitch match function 222. The user and pitch match function 222 may identify users to be targeted for specific pitches. For example, an agency may identify a target demographic for a pitch, and the function 222 may identify the users that match the target demographic.

The processor 202 may further perform a user transactions function 224. For example, if a pitch includes an optional transaction (such as a purchase, a download, a gift, or the like) the function 224 may facilitate the transaction. This facilitation may include any financial transaction, receipts generation, transmission of any data, causing specific goods to be shipped to a certain address, or the like.

The processor 202 may further perform a statistic gathering and analysis function 226. The function 226 may gather statistics related to users and pitches and may generate the statistics 214 that are stored in the memory.

The processor 202 may further perform a pitch creation function 228. The function 228 may automatically generate a pitch based on information provided by stars or agencies. The processor may also perform an augmented reality generation function 230. The function 230 may generate augmented reality content to be transferred to user devices. In that regard, the functions 228 and 230 may operate together to generate augmented reality pitches based on received content.

The processor 202 may further perform a bidding function 231. The function 231 may monitor bids for bookings or pitches, and may select a bid or combination of bids that results in the greatest amount of money being received by the operator of the system.

The network access device 204 may receive and transmit various pieces of information. For example, the network access device 204 may receive booking information 232. The booking information 232 may be received from stars and may indicate available bookings of the stars. The booking information 232 may likewise be transmitted to agencies, informing the agencies of available bookings.

The network access device 204 may further receive pitches 234. For example, an agency may generate their own augmented reality pitch and may transmit the pitch to the network access device 204. As another example, an agency may provide data related to a pitch to the network access device 204, and the functions 228 and 230 of the processor may generate a pitch based on the received data.

The network access device 204 may further receive user originated images 236. The images 236 may be received from user devices and may include images of stars and other contents therein.

The network access device 204 may further receive and transmit transactions and receipts 238. For example, the network access device 204 may receive a request from a user device to perform a transaction. The network access device 204 may further transmit information to another remote device to complete a transaction. The network access device 204 may also transmit receipts of transactions to the user devices.

The network access device 204 may also transmit statistics 242 to star devices and to agency devices. The statistics may be the statistics 214 stored in the memory 200.

The network access device 204 may also transmit generated or received pitches 242. For example, the pitches 242 may be transmitted to agency devices for review to ensure they are acceptable to a given agency. As another example, the pitches 242 may be transmitted to user devices as augmented reality pitches. As yet another example, the pitches 242 may be received from an agency device.

Figure 3:
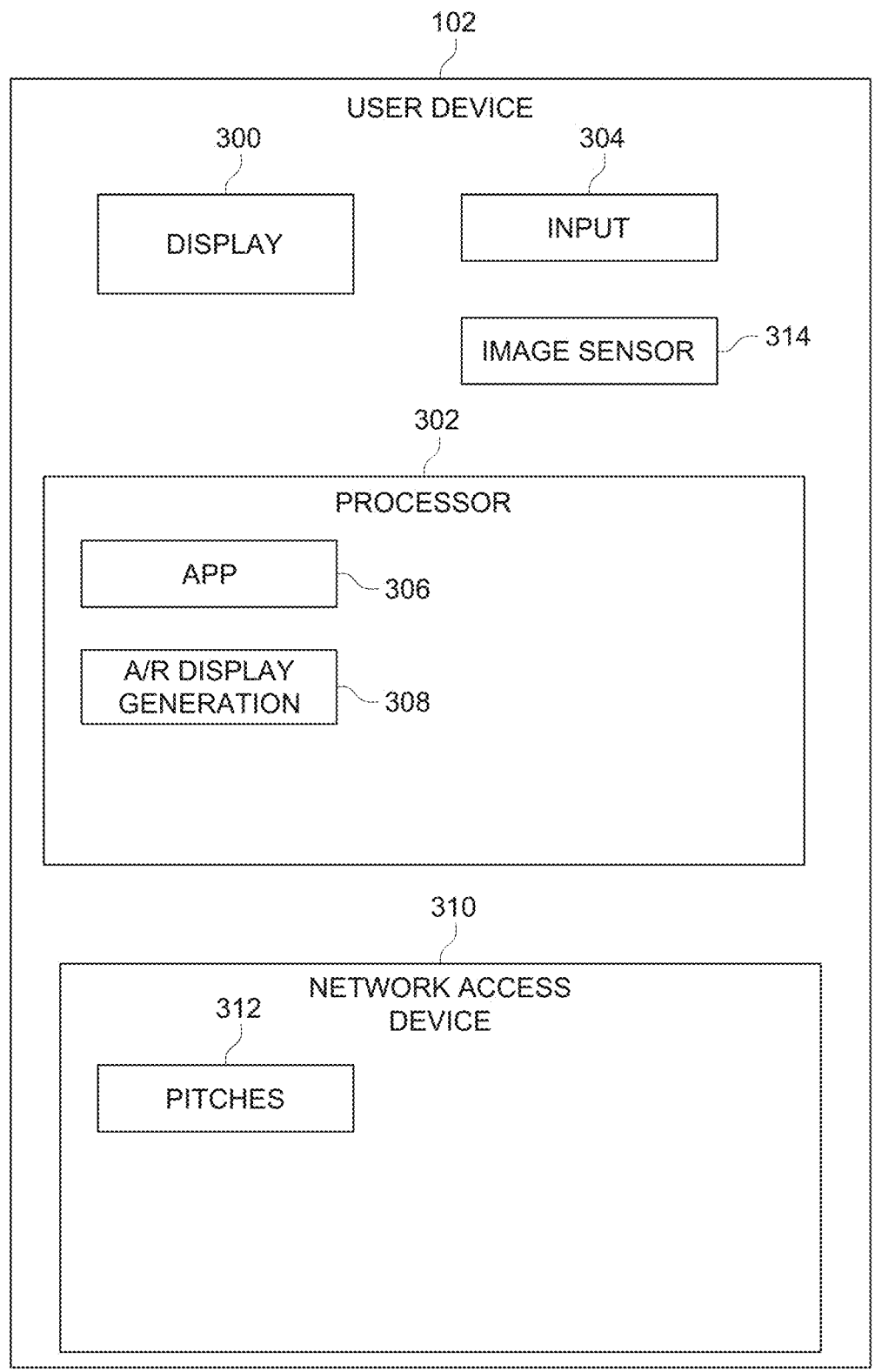
FIG. 3 is a block diagram illustrating various features of an exemplary user device used in the system of FIG. 1, according to various embodiments of the invention.

Referring now to FIG. 3, additional details of the user device 102 are shown. In particular, the user device 102 may include a display 300 capable of outputting augmented reality data. The user device 102 may further include an input device 304 such as a button, dial, or the like. In various embodiments, the display 300 and the input device 304 may be contained in a single device such as a touchscreen. The user device 102 may also include an image sensor 314 such as a camera. The image sensor 314 may be capable of detecting image data corresponding to an environment of the user device 102. In that regard, a user may point the image sensor 314 towards a subject and manipulate the input device 304 to capture an image via the image sensor 314.

The user device 102 may further include a processor 302. The processor 302 may include any processor, controller, discrete logic device, or the like capable of implementing logic. The processor 302 may perform various functions. For example, the processor 302 may perform or execute a user app 306 as described above. The processor 302 may further include an augmented reality display generation function 308. The function 308 may generate or convert augmented reality data into a format usable by the display 300.

The user device 102 may also include a network access device 310 capable of communicating via any wired or wireless protocol. For example, the network access device 310 may communicate with the server 100 of FIG. 1. The network access device 310 may receive pitches 312 from the server. The function 308 of the processor 302 may generate the augmented reality data based on the pitches 312 received by the network access device 310.

Figure 4:
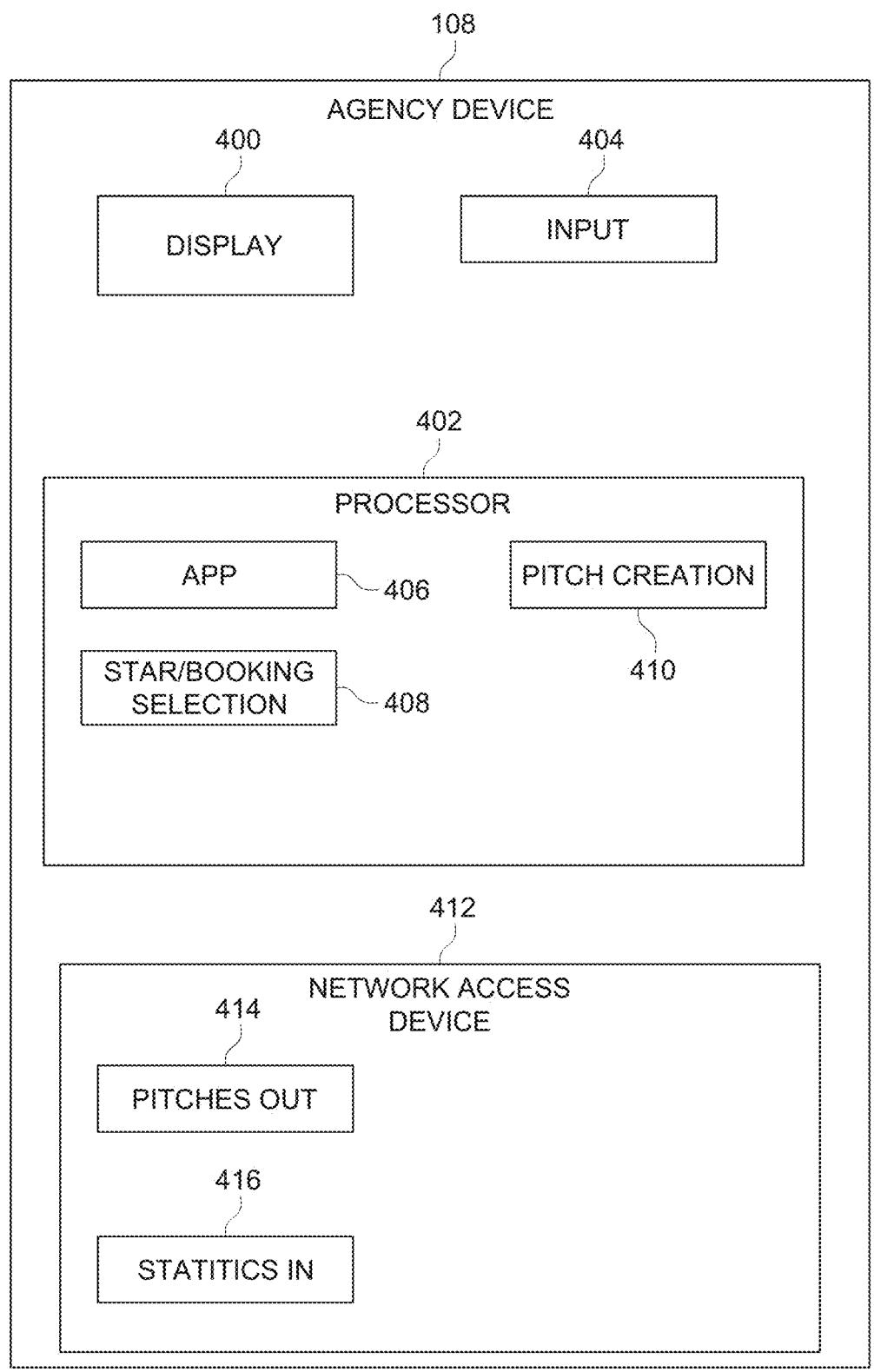
FIG. 4 is a block diagram illustrating various features of an exemplary agency device used in the system of FIG. 1, according to various embodiments of the invention.

Referring now to FIG. 4, additional details of the agency device 108 are shown. In particular, the agency device 108 may include a display 400 and an input device 404.

The agency device 108 may also include a processor 402 and a network access device 412. The processor 402 may include any processor, controller, discrete logic device, or the like capable of implementing logic. The processor 402 may perform various functions. For example, the processor 402 may perform or execute an agency app 406 as described above.

The processor 402 may further perform a star or booking selection function 408. This star or booking selection function 408 may be used to automatically or semi-automatically bid on available bookings based on preferences of the specific agency such as pre-selected priority stars or pre-selected priority demographics.

The processor 402 may further perform a pitch creation function 410. The function 410 may be used to create an augmented reality pitch based on various information received by the input device 404. In some embodiments, the function 410 may automatically generate an augmented reality pitch.

The network access device 412 may be capable of communicating via any wired or wireless protocol. The network access device 412 may communicate with the server 100 of FIG. 1. For example, the network access device 412 may transmit pitches 414 to the server 100 based on the pitches generated by the function 410.

The network access device 412 may further receive statistics 416 from the server 100 of FIG. 1. The statistics 416 may be output, for example, by the display 400.

Figure 5:
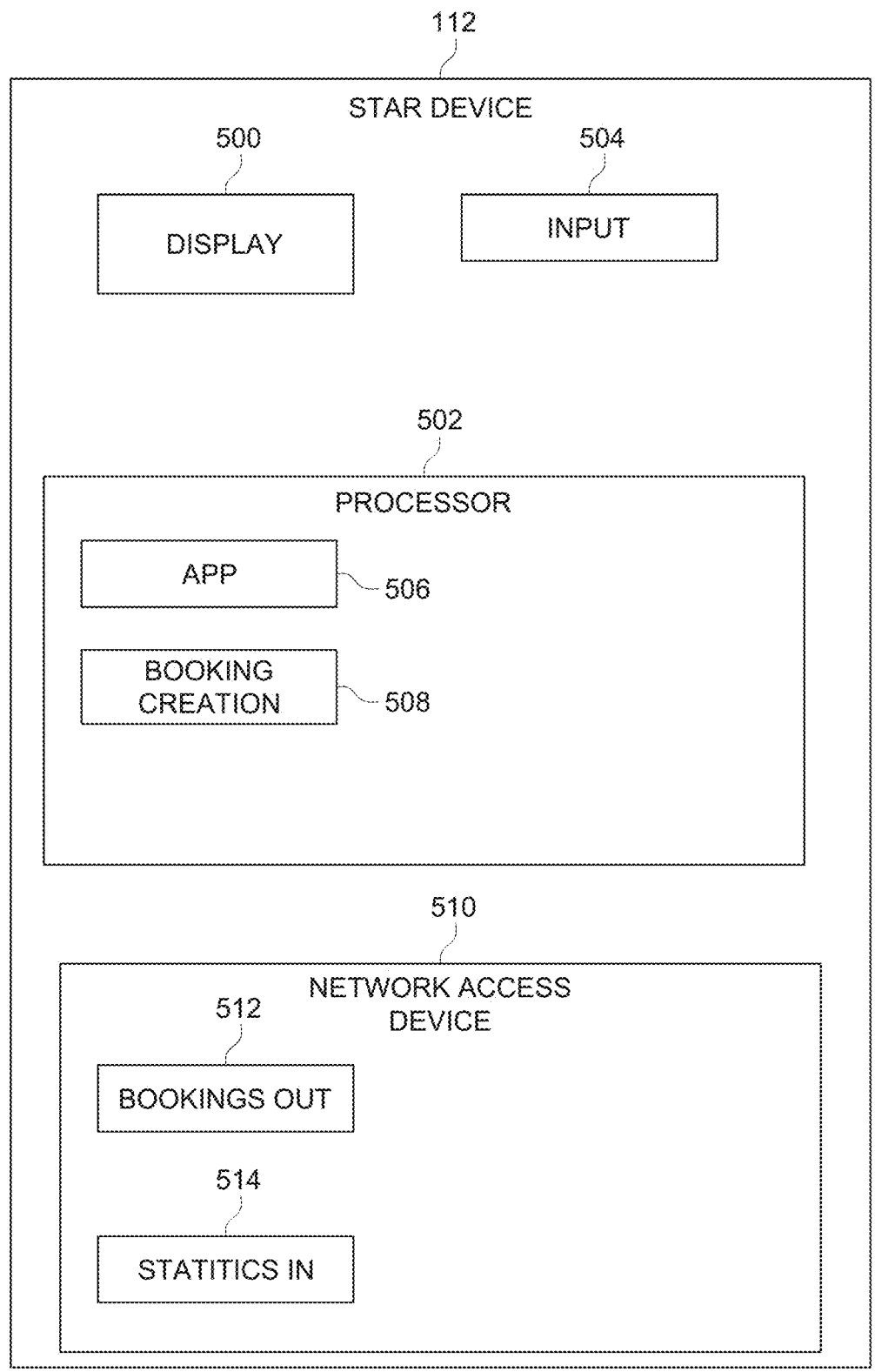
FIG. 5 is a block diagram illustrating various features of an exemplary star device used in the system of FIG. 1, according to various embodiments of the invention.

Turning now to FIG. 5, additional details of the star device 112 are shown. In particular, the star device 112 may include a display 500 and an input device 504, which may include a touchscreen or any other combination of input and output devices.

The star device 112 may further include a processor 502. The processor 502 may include any processor, controller, discrete logic device, or the like capable of implementing logic. The processor 502 may perform various functions. For example, the processor 502 may perform or execute the star app 506, as described above. The processor 502 may further perform a booking creation function 508. For example, the booking creation function 508 may create a booking based on information received by the input device 504.

The star device 112 may further include a network access device 510. The network access device 510 may be capable of communicating with the server 100 of FIG. 1 via any wired or wireless protocol. The network access device 510 may be designed to transmit and receive data, such as transmitting bookings 512 generated by the booking creation function 508. The network access device 510 may further receive statistics 514 from the server 100. The display 500 may output the statistics 514.

Figure 6A:
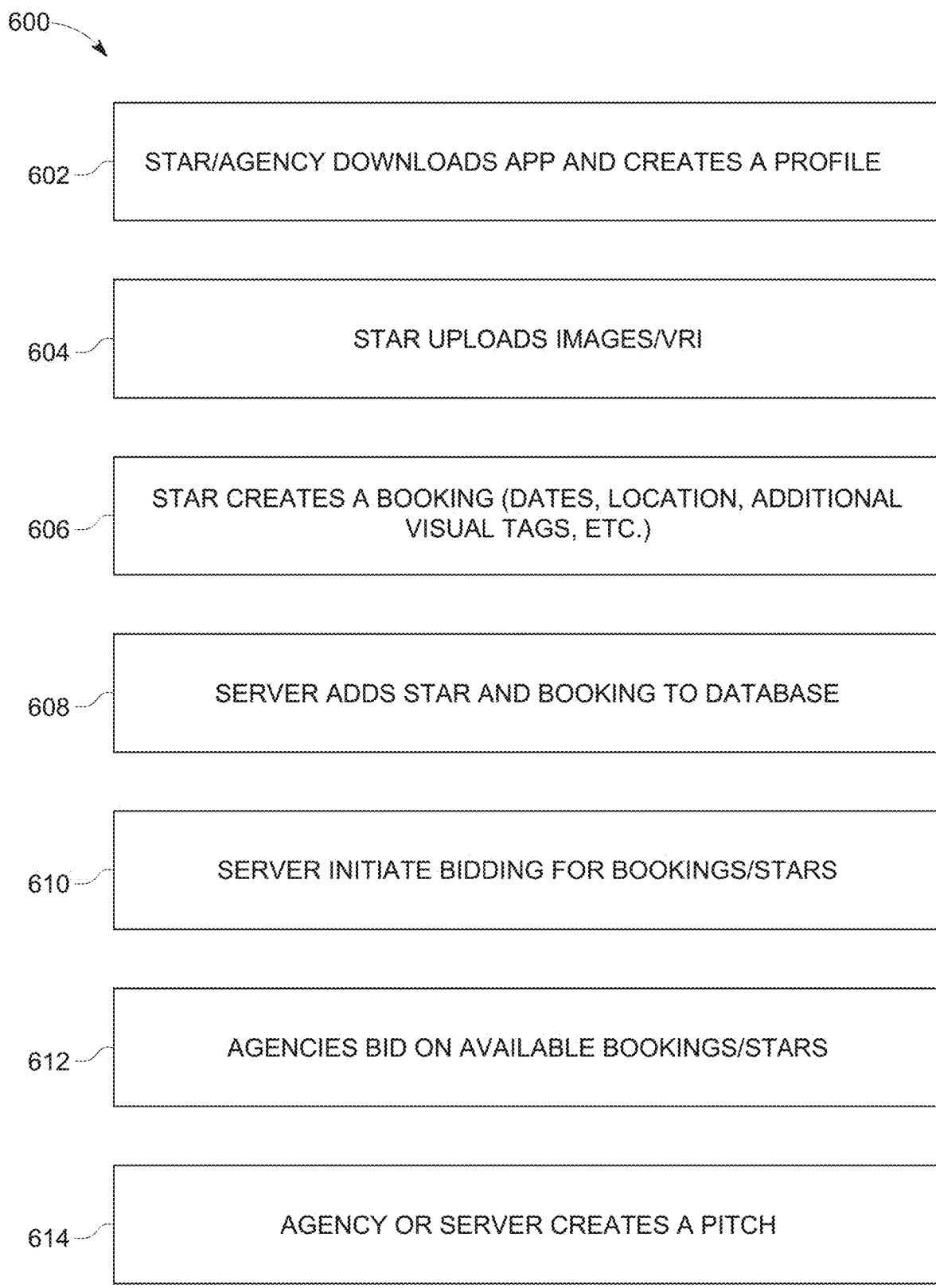
FIGS. 6A-6C are flowcharts illustrating an exemplary method for celebrity-based augmented reality advertising, according to various embodiments of the invention.
Figure 6B:
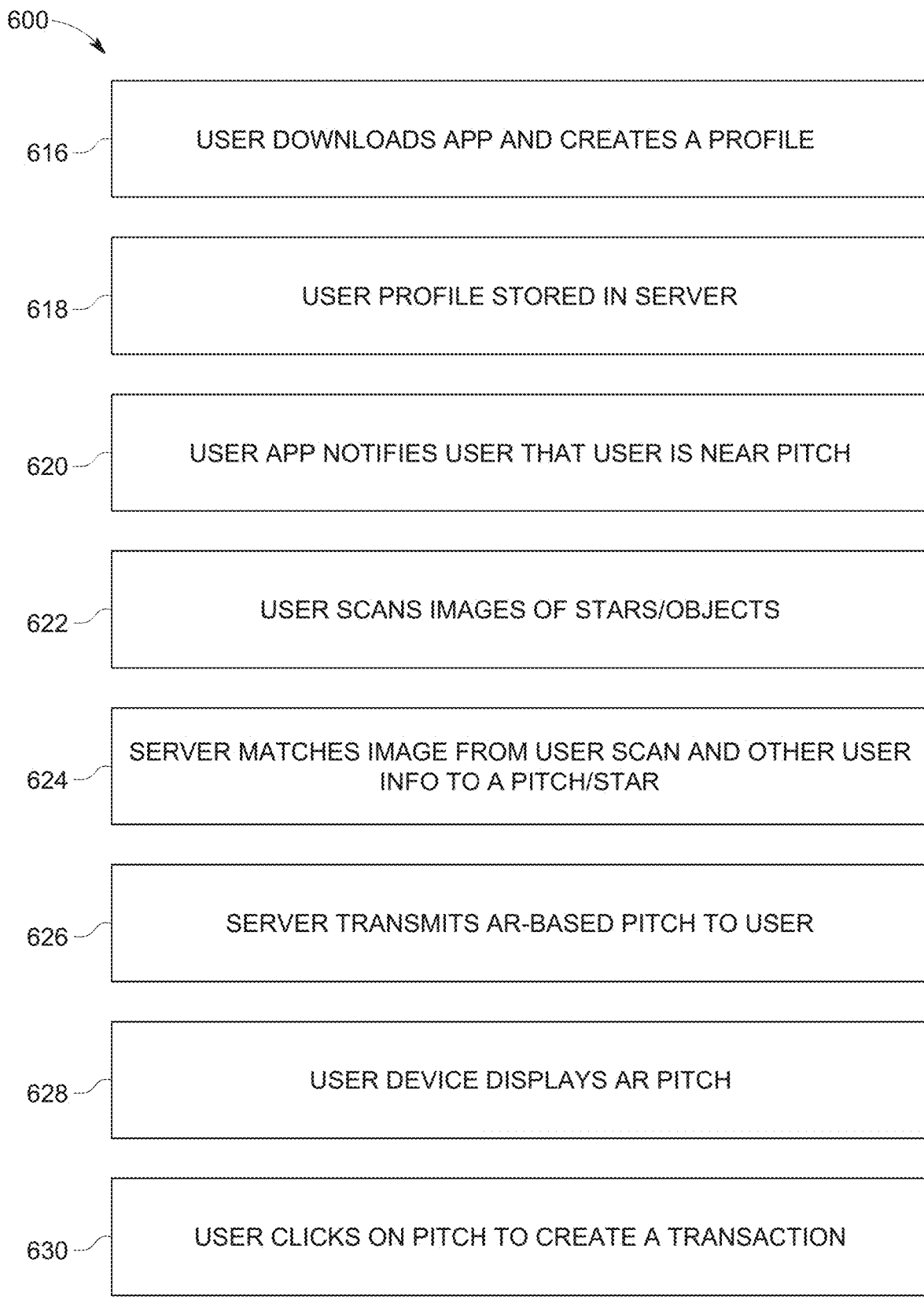
Figure 6C:
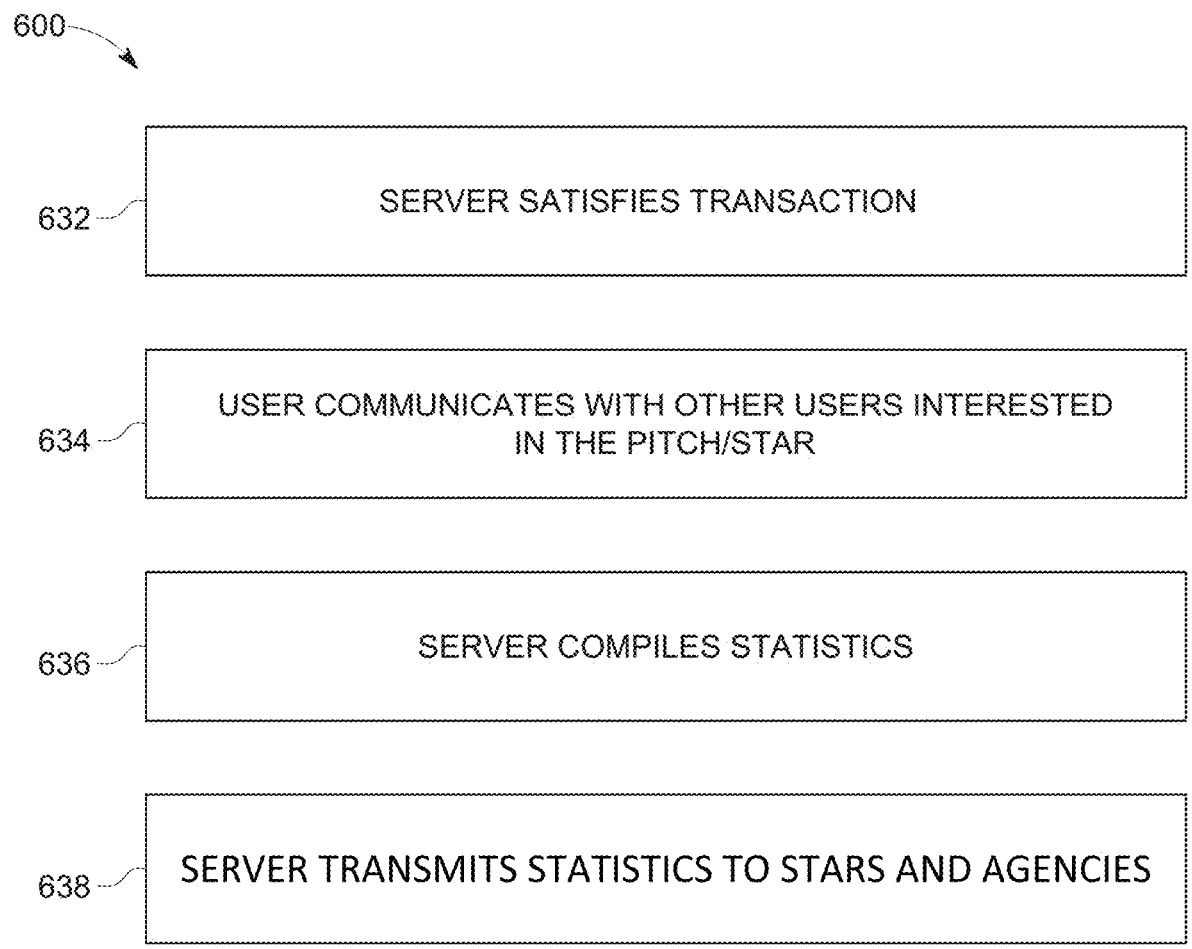

Referring now to FIGS. 6A, 6B, and 6C, a method 600 for providing a platform that exploits the virtual space around visual instances of people to deliver relevant advertising, marketing, promotional and transactional virtual experiences relevant to those people via augmented reality is shown. The method begins in block 602 where a star may download a star app and create a profile, as described above. Similarly, an agency may download an agency app and create an agency profile. The agency profile may include target demographics or other information of interest to the agencies. In block 604, the star may upload images or other visual reference information (VRI).

In block 606, the seller may create or generate a booking. The booking may include, for example, dates, locations, additional visual tags (e.g., logos), or the like. In block 608, the server may add the star and the booking to a database of available stars and bookings.

In block 610, the server may initiate bidding for bookings and/or stars. In block 612, one or more agency may place bids on the available bookings and/or stars. As a result of the bidding process, one or more agency may win a bid for a specific booking and/or star. In block 614, the advertising agency or the server may create a pitch for the specific booking.

In block 616, one or more user may download a user app and may create a user profile, as described above. In block 618, the user profile may be stored in the server.

In block 620, the user app may notify the user that the user is near a booking or a pitch. The user app may determine this information based on GPS information in the user device. In block 622, the user may scan images of stars or objects of interest to the user. The images may be uploaded to the server.

In block 624, the server may match an image from the user scan along with other information (such as user demographics, user location, or the like) to a specific pitch or a specific star. In block 626, the server may transmit an augmented reality-based pitch to the user based on the match of block 624. In block 628, the user device may display the augmented reality pitch. In block 630, the user may click on a pitch in order to initiate a transaction such as a purchase or download. In block 632, the server may satisfy the transaction.

In block 634, the server may connect users together who are interested in the specific pitch or star. In that regard, the users may communicate with each other regarding the specific page or the star. In this way, the method 600 may facilitate a social network.

In block 636, the server may compile statistics regarding the specific pitches, bookings, and stars. In block 638, the server may transmit the compiled statistics to the stars and to the agencies.

Figure 7A:
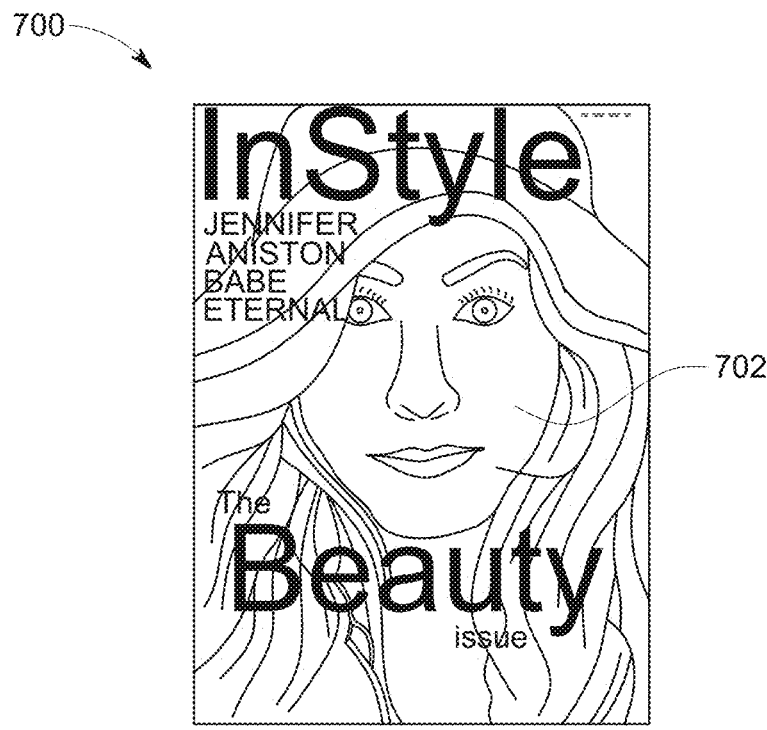
FIGS. 7A-7C are drawings illustrating an exemplary use of the method of FIGS. 6A-6C by a user device, according to various embodiments of the invention.
Figure 7A:
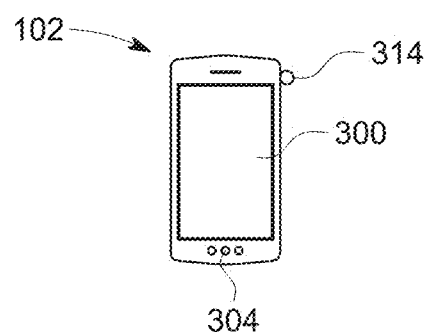
Figure 7B:
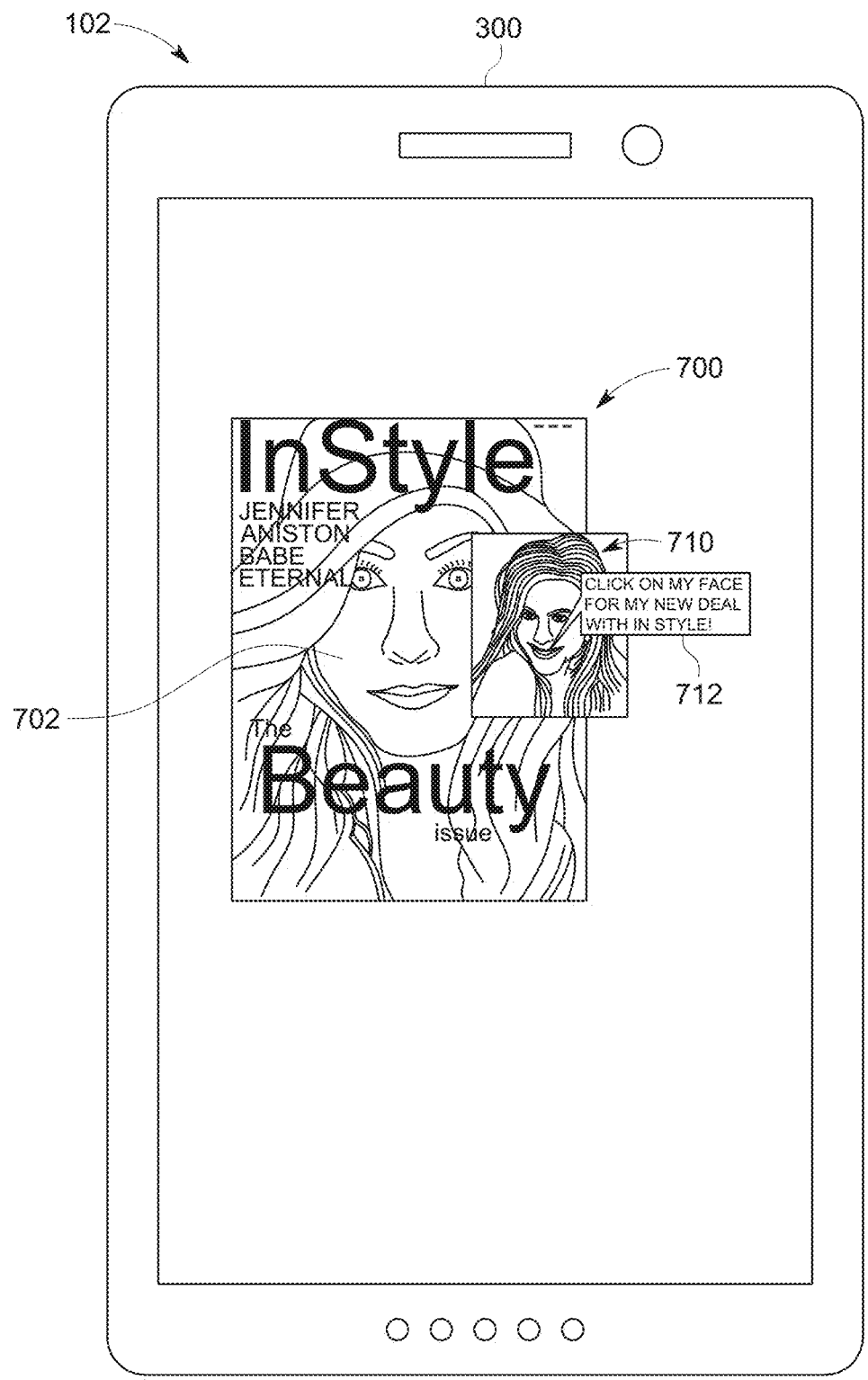
Figure 7C:
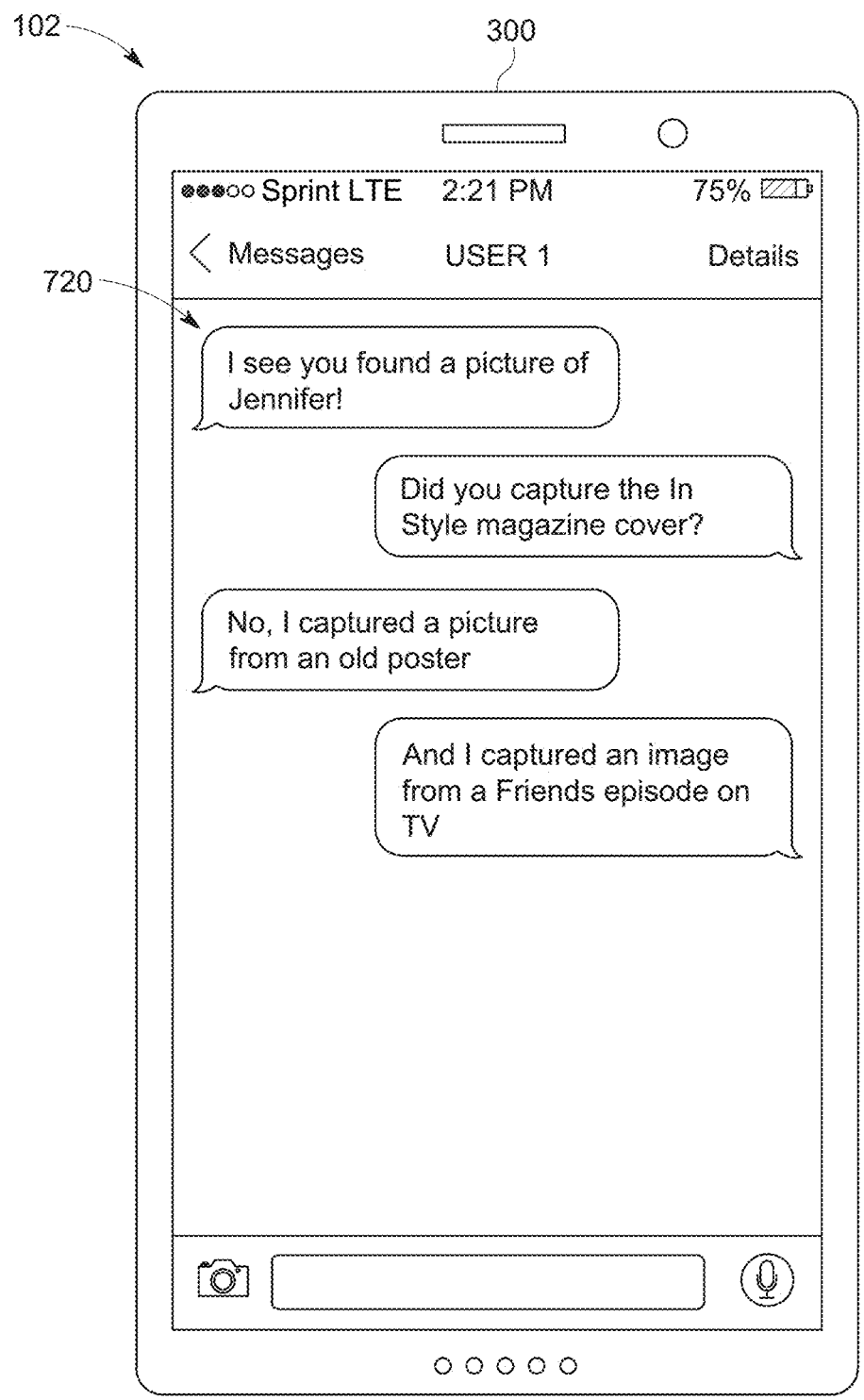

Turning now to FIGS. 7A-7C, an exemplary implementation of the method 600 of FIGS. 6A-6C by the user device 102 is shown. In particular, the user device 102 may run a user app as described herein. While using the user device 102, the user may find a magazine 700 that has an image 702 of Jennifer Aniston on it. The user may wish to engage with the app based on the image 702. In that regard, the user may direct the camera 314 towards the magazine 700 and manipulate the input device 304 to capture an image of the magazine 700 that further includes the representation of Jennifer Aniston. The magazine may be displayed on the output device 300.

After capturing the image, the app may cause the output device 300 to display a copy of the magazine 700. The app may further find a specific pitch associated with Jennifer Aniston and may determine that the user and user device 102 fit within the pitch parameters such that the user device 102 is authorized to receive the pitch. In response to this determination, the app may cause the output device 300 to output a pitch 710 that includes an overlay of Jennifer Aniston over the representation of the magazine 700 and further includes an option 712 to engage with the pitch. In particular, the option 712 may allow a user to click on the option 712 to access a deal or other transaction that is associated with the pitch 710.

The user device 102 may also be authorized to join a conversation associated with the pitch 710 via a social network. In particular, after capturing the image of the magazine 700, the user device 102 may be connected with other users that have also accessed the pitch 710 such that a conversation 720 between the user device 102 and the other user devices may be initiated.

Turning to FIGS. 8A-8D, another exemplary implementation of the method 600 of FIGS. 6A-6C as performed by the agency device 108 is shown. In particular, the display 400 of the agency device 108 may provide a field 800 in which an associated agency may input desirable parameters for a booking. The agency may input this device to find one or more booking which the agency may desire to pursue for creation of a pitch. The field 800 may include multiple fields for each desirable parameter such as a date range 802 in which the booking is available, a time range 804 in which the booking is available, a target demographic 806 that the subject (i.e., star) would target, a desirable subject 808 (e.g., a star, stadium, location, or the like), a geographical area 810 in which the booking is available, and a subject matter of a potential pitch 812 (e.g., beauty supplies, a movie, vaping e-juice, or the like). The user of the agency device 108 may select any of the fields such as the subject 808 and the demographic 806. After selecting the subject 808, the output device 400 may output an additional field 814 that allows the agency device 108 to enter names 816 of desirable subjects. After selecting the target demographic 806, the output device 400 may output an additional field 818 that allows the agency device 108 to enter details 820 regarding the target demographic.

After entering all desirable parameters, the agency device 108 may request a listing of all potential bookings that match the details of the desirable parameters. The agency device 108 may then receive a list of all bookings that match the desirable parameters, and may output detailed information about each booking (e.g., may output information corresponding to a first booking 830 and may output information corresponding to a second booking 846). The detailed information may provide a field 832 allowing the agency device 108 to bid on each booking 830, 846.

Figure 8A:
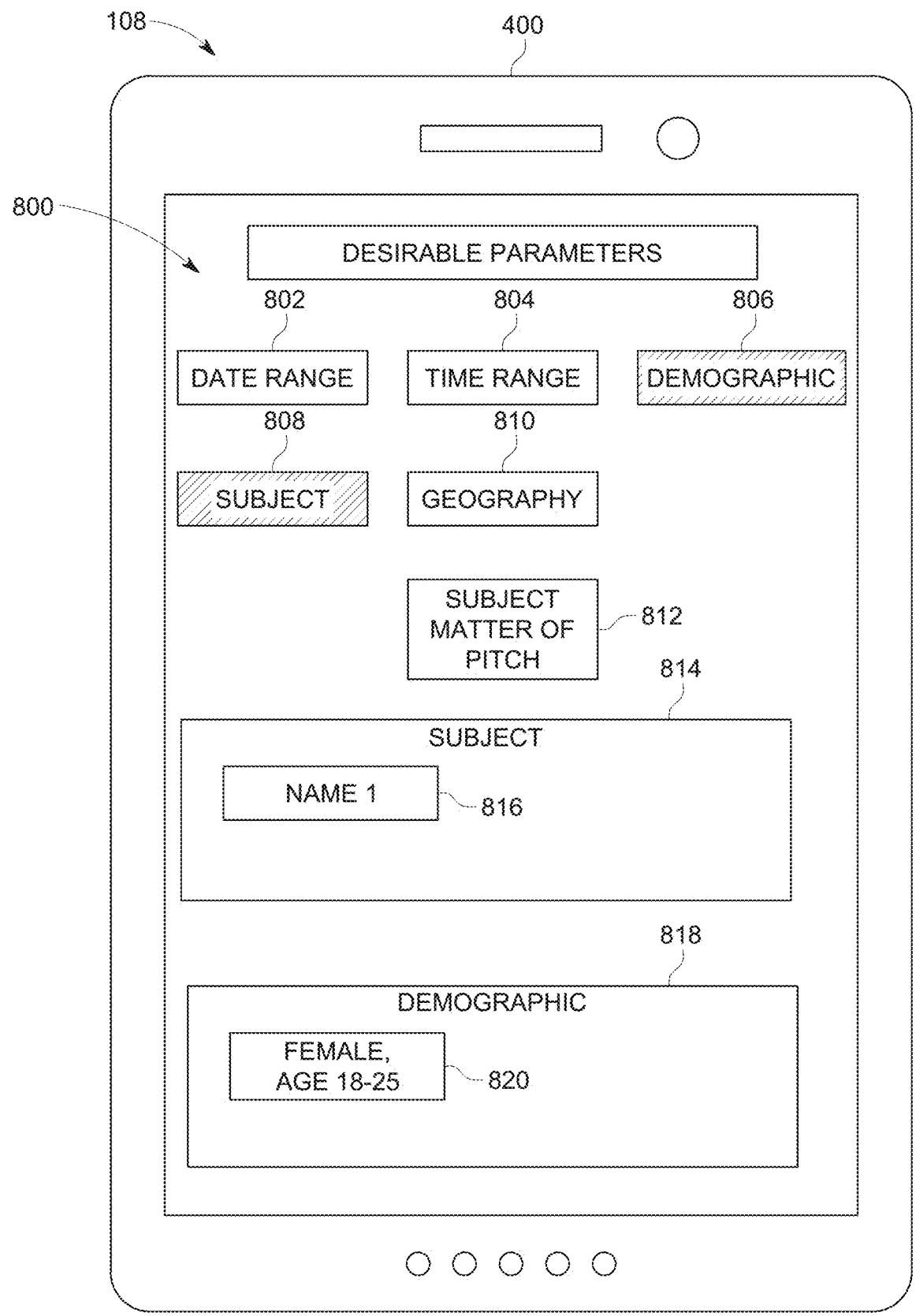
FIGS. 8A-8D are drawings illustrating an exemplary use of the method of FIGS. 6A-6C by an agency device, according to various embodiments of the invention.
Figure 8B:
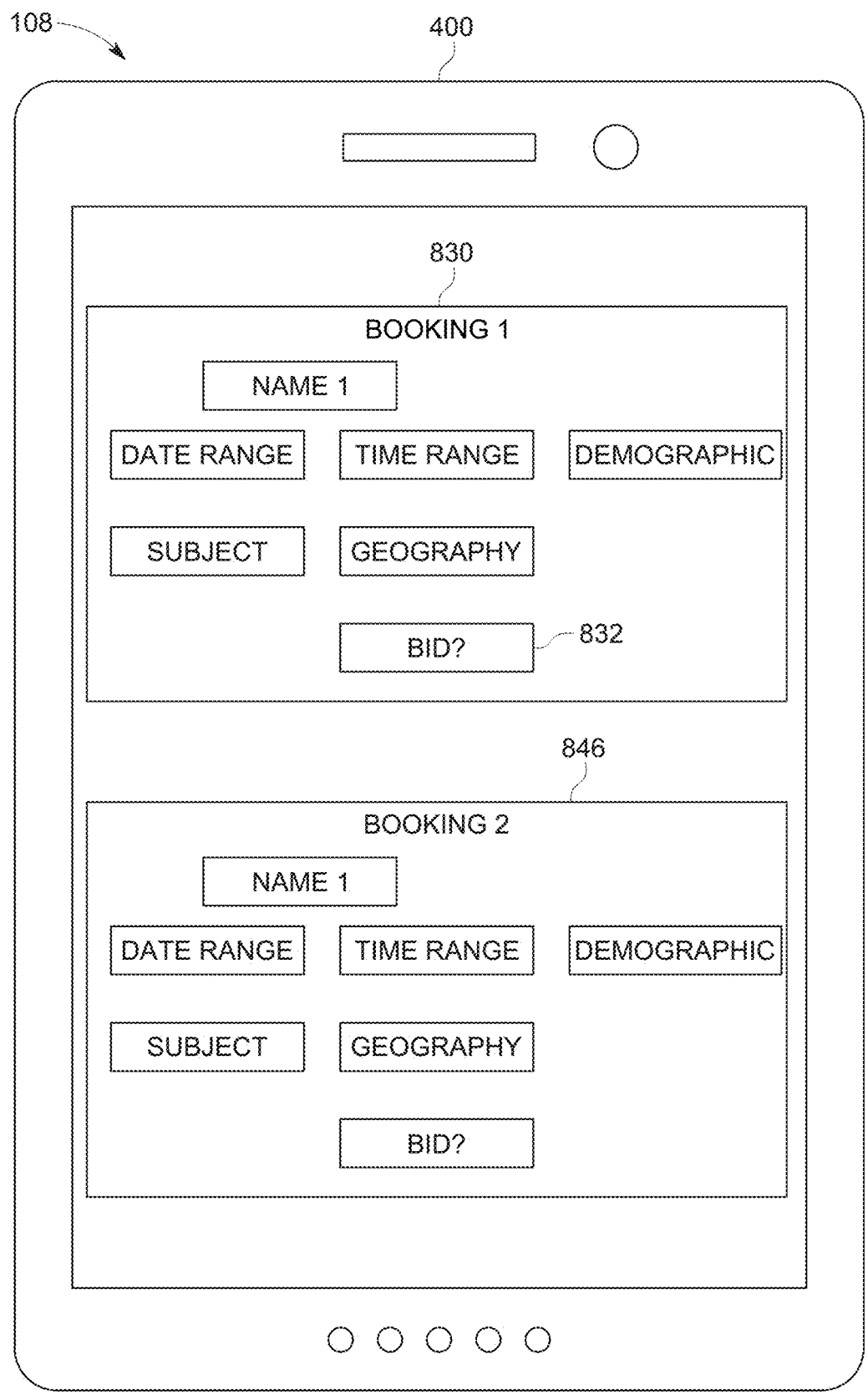
Figure 8C:
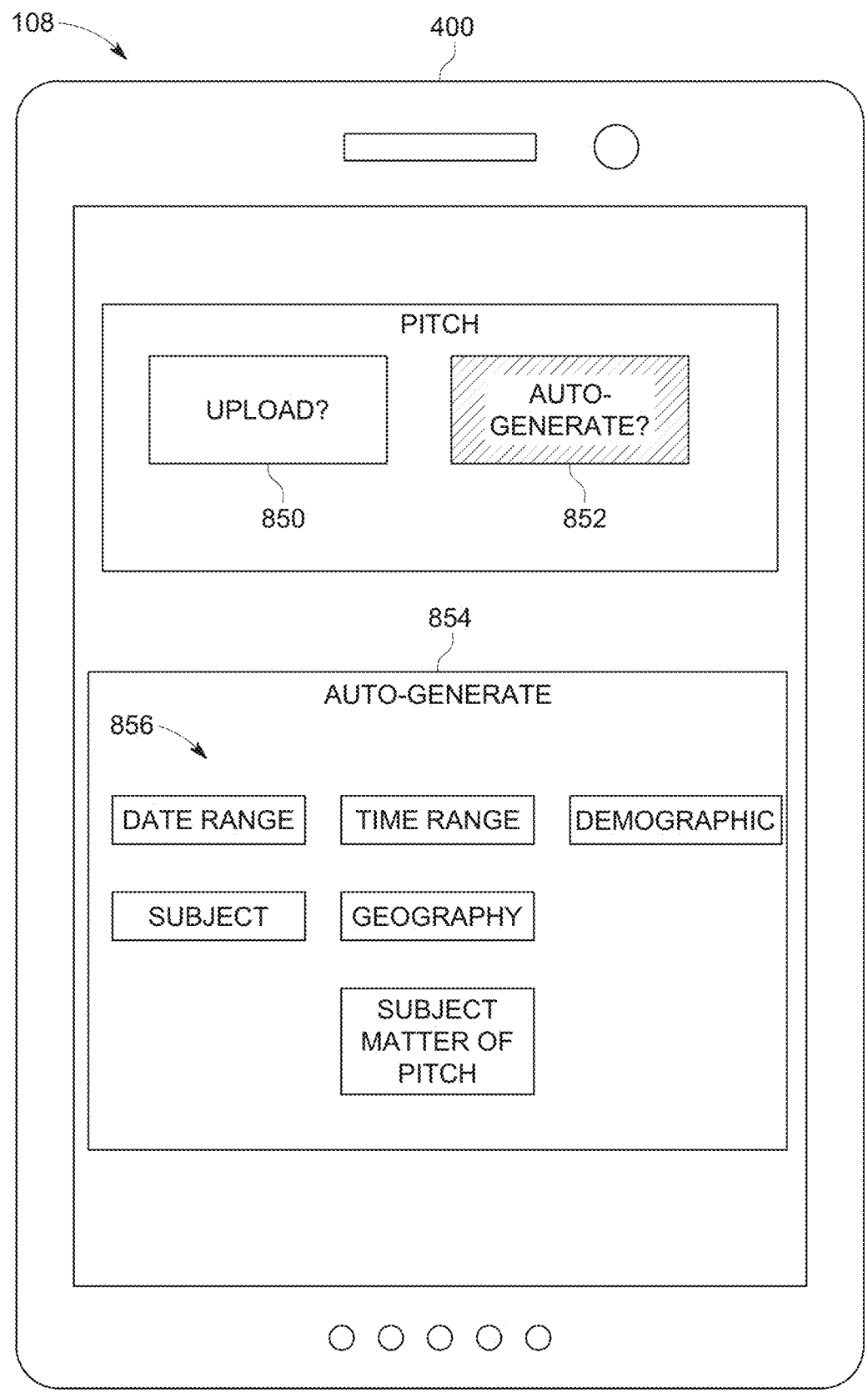

After placing a bid, the agency device 108 may be notified that it successfully won any winning bids. As shown in FIG. 8C, the agency device 108 may be provided with an option 850 to upload their own pitch and an option 852 for the app to automatically generate a pitch. In response to the agency device 108 selecting the app to automatically generate the pitch, the agency device 108 may output options 854 including a list of fields 856. The agency device 108 may provide some or all information requested in the options 854. After providing this information, the app may generate a pitch to be associated with the winning booking.

Figure 8D:
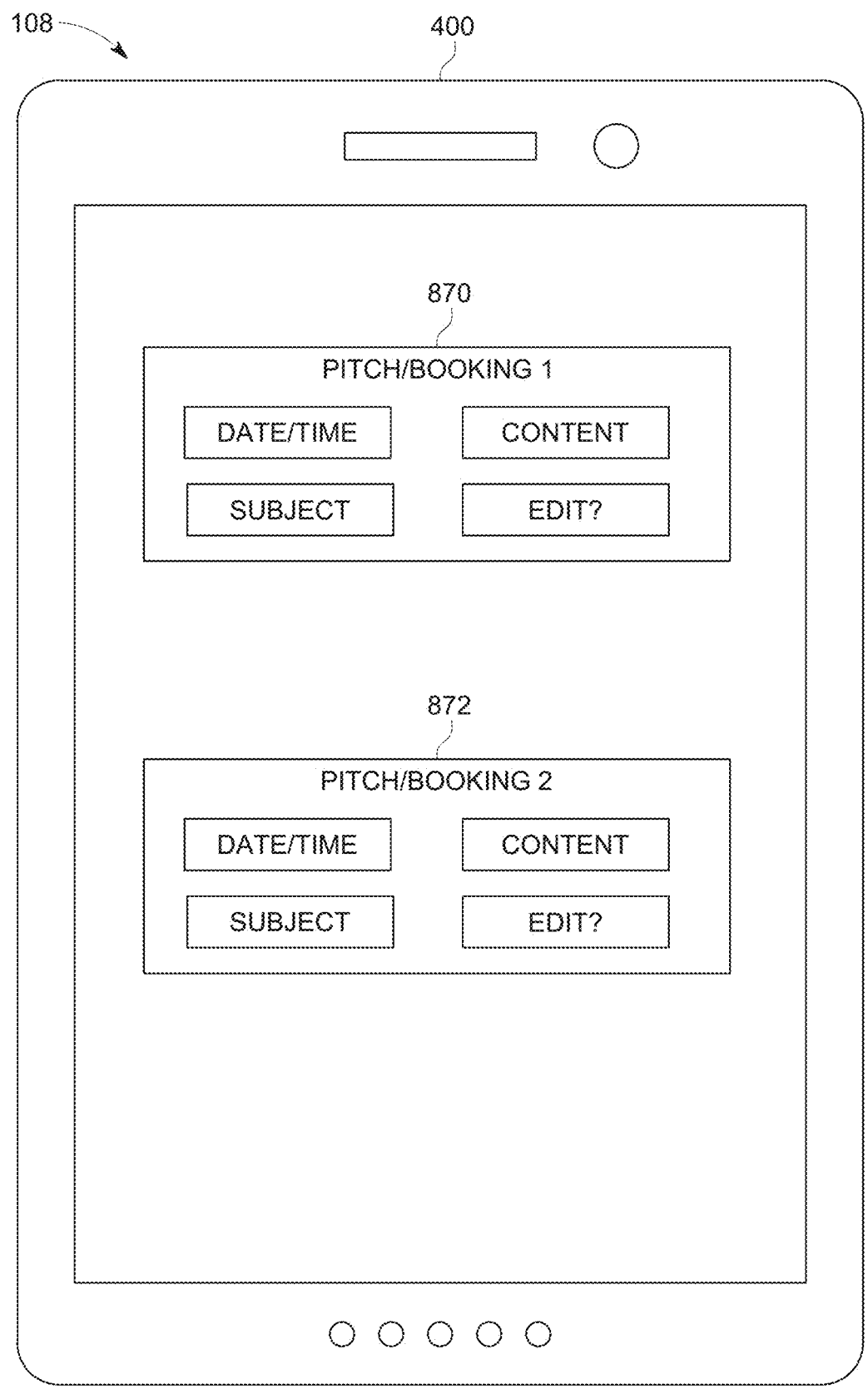

At any point in time, the agency device may access a list of upcoming, current, or past bookings. For example, FIG. 8D illustrates an exemplary list of all upcoming pitch/booking combinations including a first pitch/booking combination 870 and a second pitch/booking combination 872. Each pitch/booking combination 870, 872 may include detailed information about the pitch and booking such as a date and time in which the pitch will run, the content of the pitch, the subject of the pitch, and an option to edit any information associated with the pitch.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for celebrity-based advertising, the method comprising:
    storing, in a server, a likeness of subject and a corresponding booking that includes parameters outlining availability of the subject for digital advertising;
    receiving or creating, by the server, a pitch that falls within the parameters of the booking, the pitch corresponding to the subject;
    receiving, by the server and from a first user device, a first image of the likeness of the subject or another likeness of the subject;
    determining, by the server, that the image matches the likeness of the subject; and
    transmitting, by the server, the pitch to the first user device to be output by the first user device, wherein transmitting the pitch to the first user device further includes at least one of transmitting a blockchain-traceable non-fungible token (NFT) related to the subject to the first user device or transferring the NFT to an account associated with the first user device.

2. The method of claim 1 further comprising determining that the user device has collected a predetermined quantity or set of NFTs related to the subject, and at least one of transmitting a new blockchain-traceable NFT related to the subject to the first user device or transferring the new NFT to the account associated with the first user device in response to determining that the user device has collected the predetermined quantity or set of NFTs.

3. The method of claim 1 further comprising determining that the user device has collected a predetermined quantity or set of NFTs related to the subject, and transmitting a new pitch to the first user device in response to determining that the user device has collected the predetermined quantity or set of NFTs.

4. The method of claim 1 further comprising mining the NFT in response to determining that the image matches the likeness of the subject.

5. The method of claim 1 wherein determining that the first image matches the likeness of the subject is performed using machine learning such that the server determines that the first image matches the likeness of the subject regardless of an age of the subject in the first image or an age of the subject in the likeness, and regardless of an angle of the object within the first image or an angle of the object within the likeness.

6. The method of claim 5 wherein the subject is a human and is identified as a celebrity.

7. The method of claim 1 further comprising:
    notifying, by the server, agency devices that the booking is available for bidding and a description of the parameters;
    receiving, by the server and from the agency devices, multiple bids for the booking;
    determining, by the server, a winning bid from the multiple bids; and
    notifying, by the server, at least one winning agency device that the at least one winning agency device corresponds to the winning bid.

8. The method of claim 7 wherein the winning bid includes two winning bids that each correspond to a different portion of the booking, and wherein determining the winning bid further includes selecting a combination of winning bids that provide a greatest amount of money without overlapping within the booking.

9. The method of claim 7 further comprising receiving, from the at least one agency device, the pitch.

10. The method of claim 7 further comprising:
    storing, by the server, a plurality of templates each corresponding to at least one type of pitch;
    matching, by the server, pitch parameters corresponding to the at least one winning pitch with at least one of the plurality of templates; and
    completing, by the server, the pitch based on the pitch parameters and based on the at least one of the plurality of templates.

11. The method of claim 1 further comprising:
    receiving, by the server and from a star device, a subject profile corresponding to the subject that includes rules allowing for certain types of pitches to be created automatically;
    receiving, from an agency device, a request for a new pitch that falls within the rules of the subject profile; and
    automatically notifying, by the server, the agency device that the new pitch is approved.

12. The method of claim 1 wherein the parameters of the booking includes at least one of an authorized geographical limit, a type of subject matter that is at least one of authorized or unauthorized for pitches, at least one of an authorized date range or an authorized time range, or a minimum payment for a corresponding pitch.

13. The method of claim 1 further comprising:
    receiving, by the server and from an agency device, desirable booking parameters indicating at least one of a desired subject of bookings, a desired target demographic corresponding to the bookings, a desired geographical area of bookings, or at least one of a desired date range or time range of the bookings;

determining, by the server, that the booking matches the desirable booking parameters; and transmitting, by the server, a notification to the agency device that the booking matches the desirable booking parameters and including information corresponding to the booking.

14. The method of claim 1 wherein the pitch includes an augmented reality visual that is output on a display of the first user device.

15. The method of claim 1 further comprising receiving, by the server and from the first user device, a purchase request, wherein the pitch includes an option to purchase a good or service and the purchase request corresponds to engagement of the option to purchase the good or service by the user device.

16. A method for celebrity-based advertising, the method comprising:

storing, in a server, a likeness of subject and a corresponding booking that includes parameters outlining availability of the subject;

notifying, by the server, agency devices that the booking is available for bidding and a description of the parameters;

receiving, by the server and from the agency devices, multiple bids for the booking;

determining, by the server, a winning bid from the multiple bids;

notifying, by the server, at least one winning agency device that the at least one winning agency device corresponds to the winning bid;

receiving or creating, by the server, a pitch that falls within the parameters of the booking and corresponds to the winning bid, the pitch including an augmented reality visual;

receiving, by the server and from a first user device, a first image of the likeness of the subject or another likeness of the subject; and transmitting, by the server, the pitch to the first user device to be output by the first user device such that the augmented reality visual is output on the first user device, wherein transmitting the pitch to the first user device further includes at least one of transmitting a blockchain-traceable non-fungible token (NFT) related to the subject to the first user device or transferring the NFT to an account associated with the first user device.

17. The method of claim 16 further comprising determining that the user device has collected a predetermined quantity or set of NFTs related to the subject, and at least one of transmitting a new blockchain-traceable NFT related to the subject to the first user device or transferring the new NFT to the account associated with the first user device in response to determining that the user device has collected the predetermined quantity or set of NFTs.

18. The method of claim 16 further comprising determining that the user device has collected a predetermined quantity or set of NFTs related to the subject, and transmitting a new pitch to the first user device in response to determining that the user device has collected the predetermined quantity or set of NFTs.

19. The method of claim 16 further comprising mining the NFT in response to determining that the image matches the likeness of the subject.

20. A method for celebrity-based advertising, the method comprising:

storing, in a server, a likeness of subject and a corresponding booking that includes parameters outlining availability of the subject;

receiving or creating, by the server, a pitch that falls within the parameters of the booking;

receiving, by the server and from a first user device, a first image of the likeness of the subject or another likeness of the subject;

determining, by the server, that the image matches the likeness of the subject using machine learning such that the server determines that the first image matches the likeness of the subject regardless of an age of the subject in the first image or an age of the subject in the likeness, and regardless of an angle of the object within the first image or an angle of the object within the likeness; and transmitting, by the server, the pitch to the first user device for outputting by the first user device, the pitch including an augmented reality visual that is output on a display of the first user device, wherein transmitting the pitch to the first user device further includes at least one of transmitting a blockchain-traceable non-fungible token (NFT) related to the subject to the first user device or transferring the NFT to an account associated with the first user device.

* * * * *